(12) United States Patent
Fukuda et al.

(10) Patent No.: US 9,930,184 B2
(45) Date of Patent: Mar. 27, 2018

(54) CORDLESS TELEPHONE DEVICE, CORDLESS TELEPHONE SYSTEM, AND DATA TRANSFER METHOD

(71) Applicant: Panasonic Intellectual Property Management Co., Ltd., Osaka (JP)

(72) Inventors: Hikaru Fukuda, Fukuoka (JP); Eiichi Hatae, Fukuoka (JP); Satoshi Ando, Fukuoka (JP); Takayoshi Shibata, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/125,928

(22) PCT Filed: Mar. 3, 2015

(86) PCT No.: PCT/JP2015/001096
§ 371 (c)(1),
(2) Date: Sep. 13, 2016

(87) PCT Pub. No.: WO2015/145995
PCT Pub. Date: Oct. 1, 2015

(65) Prior Publication Data
US 2017/0006165 A1    Jan. 5, 2017

(30) Foreign Application Priority Data
Mar. 28, 2014    (JP) .................. 2014-068686

(51) Int. Cl.
*H04M 11/00*    (2006.01)
*H04M 1/725*    (2006.01)
(Continued)

(52) U.S. Cl.
CPC ....... *H04M 11/007* (2013.01); *H04L 61/1594* (2013.01); *H04M 1/274516* (2013.01);
(Continued)

(58) Field of Classification Search
CPC ......... H04W 4/18; H04W 8/02; H04W 12/06; H04W 84/12; H04W 84/042;
(Continued)

(56) References Cited

U.S. PATENT DOCUMENTS

2007/0025531 A1    2/2007  Lin
2009/0061850 A1*   3/2009  Li ..................... H04M 1/72502
                                                    455/426.1
(Continued)

FOREIGN PATENT DOCUMENTS

EP    2 833 608 A1    2/2015
EP    3 116 201 A1    1/2017
(Continued)

OTHER PUBLICATIONS

International Search Report dated Mar. 31, 2015, for corresponding International Application No. PCT/JP2015/001096, 4 pages.
(Continued)

*Primary Examiner* — Vladimir Magloire
*Assistant Examiner* — Ernest Tacsik
(74) *Attorney, Agent, or Firm* — Seed IP Law Group LLP

(57) ABSTRACT

Slave device information transmitting unit of the present invention transmits slave device information to a mobile phone. Slave device transfer data receiving unit receives slave device transfer data from the mobile phone, and stores the slave device transfer data in storage unit. Destination slave device determining unit extracts destination slave device information from slave device transfer data stored in storage unit, and selects a cordless telephone slave device which is a destination of the slave device transfer data, based on destination slave device identification information which is set in the destination slave device information. Slave device transfer data transmitting unit transmits slave device
(Continued)

transfer data to a cordless telephone slave device selected by destination slave device determining unit.

9 Claims, 16 Drawing Sheets

(51) Int. Cl.
    *H04L 29/12* (2006.01)
    *H04W 12/06* (2009.01)
    *H04M 1/2745* (2006.01)
    *H04M 3/42* (2006.01)
    *H04M 7/00* (2006.01)
    *H04W 84/04* (2009.01)
    *H04W 84/12* (2009.01)
    *H04W 88/08* (2009.01)

(52) U.S. Cl.
    CPC ... *H04M 1/72502* (2013.01); *H04M 3/42017* (2013.01); *H04W 12/06* (2013.01); *H04L 61/6068* (2013.01); *H04M 3/42229* (2013.01); *H04M 7/0069* (2013.01); *H04M 2250/06* (2013.01); *H04M 2250/08* (2013.01); *H04M 2250/64* (2013.01); *H04W 84/042* (2013.01); *H04W 84/12* (2013.01); *H04W 88/08* (2013.01)

(58) Field of Classification Search
    CPC ............... H04W 88/08; H04L 61/1594; H04L 61/6068; H04M 7/0069; H04M 1/72502; H04M 1/274516; H04M 11/007; H04M 2250/06; H04M 2250/64; H04M 2250/08; H04M 3/42017; H04M 3/42229
See application file for complete search history.

(56) References Cited

U.S. PATENT DOCUMENTS

| | | | | |
|---|---|---|---|---|
| 2009/0196411 | A1* | 8/2009 | Hawkins | H04M 1/57 379/211.02 |
| 2011/0306343 | A1* | 12/2011 | Buford | H04M 1/2535 455/435.1 |
| 2014/0362839 | A1 | 12/2014 | Fukuda et al. | |

FOREIGN PATENT DOCUMENTS

| | | |
|---|---|---|
| JP | 2001-358799 A | 12/2001 |
| JP | 2003-101632 A | 4/2003 |
| JP | 2003-348254 A | 12/2003 |
| JP | 3116750 U | 12/2005 |
| JP | 2007-116212 A | 5/2007 |
| JP | 2010-226570 A | 10/2010 |
| JP | 5438236 B1 | 3/2014 |

OTHER PUBLICATIONS

Extended European Search Report, dated May 3, 2017, for corresponding European Application No. 15758598.5-1972 / 3116201, 14 pages.

Panasonic, "Smartphone Connect App Guide, Premium Design Phone with Smartphone Connect," Model No. KX-PRW110; KR-PRW120, Jan. 1, 2013, 24 pages.

Extended European Search Report, dated Jun. 19, 2017, for corresponding Application No. 15768288.1-1972 / 3125511, 11 pages.

* cited by examiner

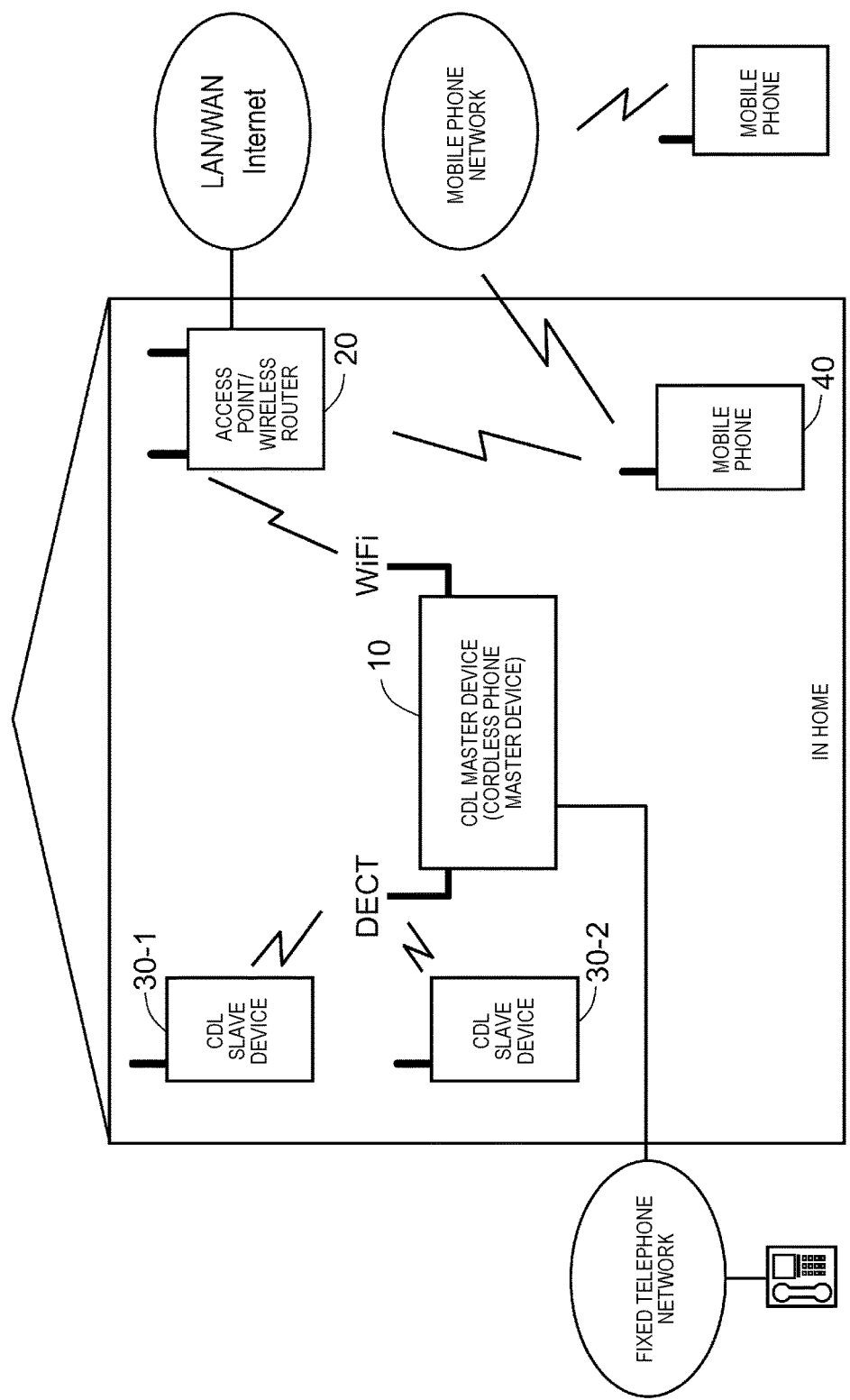

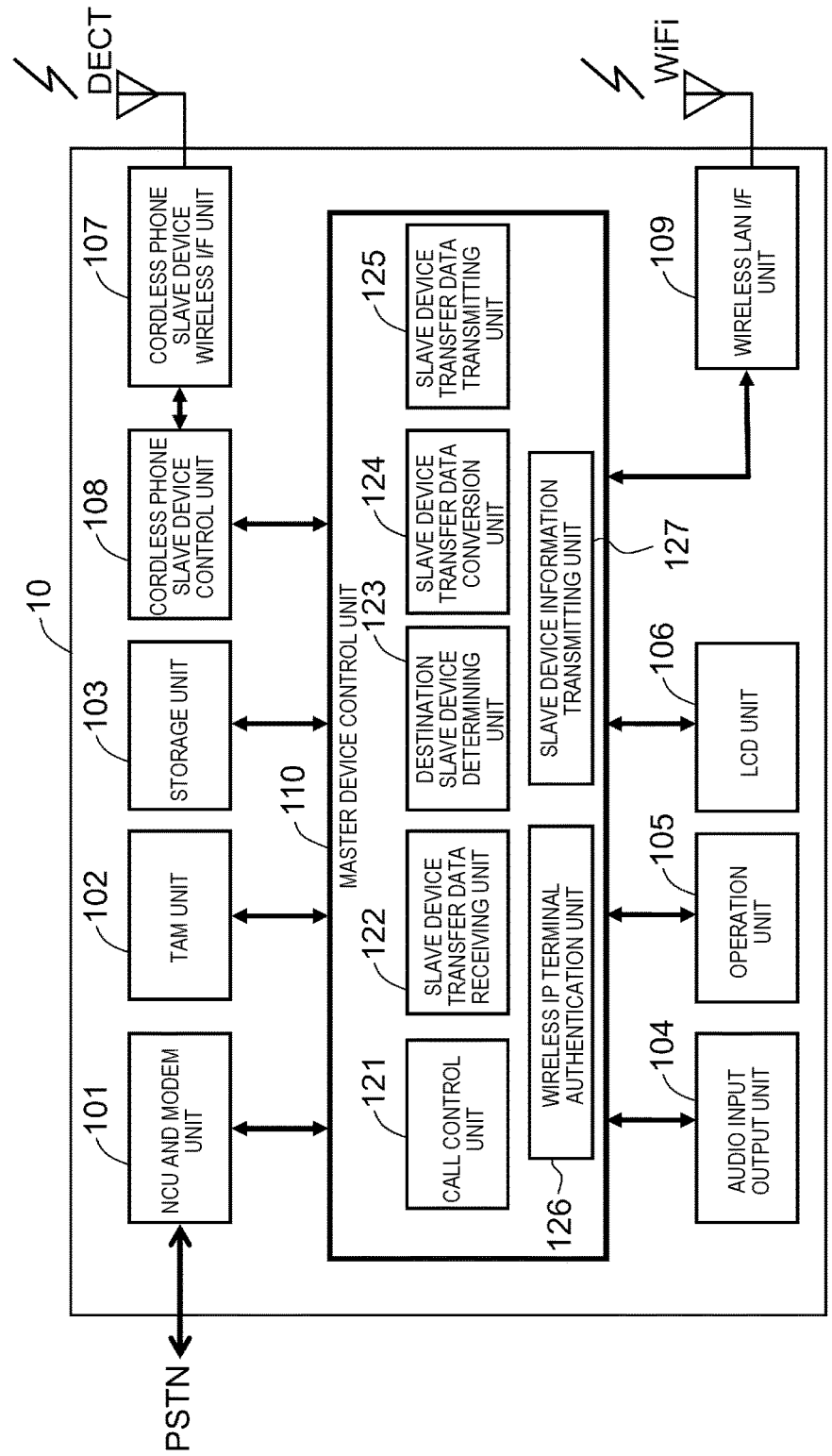

FIG. 3A

| | CONNECTION STATE | SLAVE DEVICE NAME | SLAVE DEVICE NUMBER | WALLPAPER DATA INFORMATION | THUMBNAIL DATA INFORMATION | USE CODEC | RINGTONE MEMORY INFORMATION |
|---|---|---|---|---|---|---|---|
| SLAVE DEVICE 1 | REGISTERED (CONNECTED) | Living room | 11 | 16 COLOR BMP VERTICAL x HORIZONTAL: 320 x 240 PIXEL | 16 COLOR BMP VERTICAL x HORIZONTAL: 72 x 72 PIXEL | G.722 | 500k BYTE |
| SLAVE DEVICE 2 | REGISTERED (CONNECTED) | Kitchen | 12 | 16 COLOR BMP VERTICAL x HORIZONTAL: 264 x 240 PIXEL | 16 COLOR BMP VERTICAL x HORIZONTAL: 72 x 72 PIXEL | G.722 | 500k BYTE |
| SLAVE DEVICE 3 | REGISTERED (OUTSIDE RANGE) | Bed room1 | 13 | 256 COLOR BMP VERTICAL x HORIZONTAL: 320 x 240 PIXEL | 16 COLOR BMP VERTICAL x HORIZONTAL: 92 x 92 PIXEL | G.722 | 1M BYTE |
| SLAVE DEVICE 4 | REGISTERED (CONNECTED) | Bed room2 | 14 | 256 COLOR BMP VERTICAL x HORIZONTAL: 320 x 240 PIXEL | 16 COLOR BMP VERTICAL x HORIZONTAL: 92 x 92 PIXEL | G.722 | 1M BYTE |
| SLAVE DEVICE 5 | REGISTERED (OUTSIDE RANGE) | Garage | 15 | NO DISPLAY CAPABILITY | NO DISPLAY CAPABILITY | G.711 | 500k BYTE |
| SLAVE DEVICE 6 | (UNREGISTERED) | — | — | — | — | — | — |

| WALLPAPER DATA INFORMATION | THUMBNAIL DATA INFORMATION | USE CODEC | RINGTONE MEMORY INFORMATION |
|---|---|---|---|
| 16 COLOR BMP VERTICAL x HORIZONTAL: 320 x 240 PIXEL | 16 COLOR BMP VERTICAL x HORIZONTAL: 72 x 72 PIXEL | G.722 | 500K BYTE |

FIG. 12

```
START
  ↓
RECEIVE SLAVE DEVICE TRANSFER DATA FROM MASTER DEVICE — ST801
  ↓
STORE RECEIVED SLAVE DEVICE TRANSFER DATA IN STORAGE AREA ACCORDING TO RECEIVED DATA TYPE — ST802
  ↓
END
```

FIG. 13

|  | AUTHENTICATION ID | AUTHENTICATION PASSWORD |
|---|---|---|
| WIRELESS IP TERMINAL 1 | 11111111 | pw11111111 |
| WIRELESS IP TERMINAL 2 | 22222222 | pw 22222222 |
| WIRELESS IP TERMINAL 3 | 33333333 | pw 33333333 |
| WIRELESS IP TERMINAL 4 | 44444444 | pw44444444 |
| WIRELESS IP TERMINAL 5 | — (NOT REGISTERED) | — |
| WIRELESS IP TERMINAL 6 | — (NOT REGISTERED) | — |

FIG. 14

| | SLAVE DEVICE DATA TRANSFER RESTRICTION | WIRELESS IP TERMINAL AUTHENTICATION ID 1 | WIRELESS IP TERMINAL AUTHENTICATION ID 2 | WIRELESS IP TERMINAL AUTHENTICATION ID 3 |
|---|---|---|---|---|
| SLAVE DEVICE 1 | PRESENCE | 11111111 | – | – |
| SLAVE DEVICE 2 | PRESENCE | 22222222 | – | – |
| SLAVE DEVICE 3 | ABSENCE | – | – | – |
| SLAVE DEVICE 4 | ABSENCE | – | – | – |
| SLAVE DEVICE 5 | PRESENCE | 11111111 | 22222222 | 33333333 |
| SLAVE DEVICE 6 | –<br>(NOT REGISTERED) | – | – | – |

FIG. 15

| | SLAVE DEVICE NAME | SLAVE DEVICE NUMBER | WALLPAPER DATA INFORMATION | THUMBNAIL DATA INFORMATION | USE CODEC | RINGTONE MEMORY INFORMATION |
|---|---|---|---|---|---|---|
| SLAVE DEVICE 1 | Living room | 11 | 16 COLOR BMP VERTICAL x HORIZONTAL: 264 x 240 PIXEL | 16 COLOR BMP VERTICAL x HORIZONTAL: 72 x 72 PIXEL | G.722 | 500k BYTE |
| SLAVE DEVICE 3 | Bed room1 | 13 | 256 COLOR BMP VERTICAL x HORIZONTAL: 240 x 320 PIXEL | 16 COLOR BMP VERTICAL x HORIZONTAL: 92 x 92 PIXEL | G.722 | 1M BYTE |
| SLAVE DEVICE 4 | Bed room2 | 14 | 256 COLOR BMP VERTICAL x HORIZONTAL: 240 x 320 PIXEL | 16 COLOR BMP VERTICAL x HORIZONTAL: 92 x 92 PIXEL | G.722 | 1M BYTE |
| SLAVE DEVICE 5 | Garage | 15 | NO DISPLAY CAPABILITY | NO DISPLAY CAPABILITY | G.711 | 500k BYTE |

FIG. 17

|  | WIRELESS IP TERMINAL AUTHENTICATION ID |
|---|---|
| SLAVE DEVICE 1 | 11111111 |
| SLAVE DEVICE 2 | 22222222 |
| SLAVE DEVICE 3 | 33333333 |
| SLAVE DEVICE 4 | 44444444 |
| SLAVE DEVICE 5 | 55555555 |
| SLAVE DEVICE 6 | — |

FIG. 18

| | SLAVE DEVICE NAME | SLAVE DEVICE NUMBER | WALLPAPER DATA INFORMATION | THUMBNAIL DATA INFORMATION | USE CODEC | RINGTONE MEMORY INFORMATION |
|---|---|---|---|---|---|---|
| SLAVE DEVICE 1 | Living room | 11 | 16 COLOR BMP VERTICAL x HORIZONTAL: 264 x 240 PIXEL | 16 COLOR BMP VERTICAL x HORIZONTAL: 72 x 72 PIXEL | G.722 | 500k BYTE |

CORDLESS TELEPHONE DEVICE, CORDLESS TELEPHONE SYSTEM, AND DATA TRANSFER METHOD

TECHNICAL FIELD

The present invention relates to a cordless telephone device which is wirelessly connected to a mobile phone having a wireless LAN communication unit, a cordless telephone system including the cordless telephone device, and a data transfer method which is used in the cordless telephone device and the cordless telephone system.

BACKGROUND ART

In recent years, a wireless LAN communication unit (a Wi-Fi (registered trademark) function of the IEEE.802.11 standard) is provided in a mobile phone (so-called, including a smart phone) to be connected to a mobile telephone network, and it is able to connect to the Internet in a wireless LAN environment of home or an office (hereinafter, referred to as "in home") using the mobile phone, and use various internet services such as Web browsing and IP phones.

It has become common for the user to freely customize ringtone and wallpaper data in the mobile phone, such as by using his favorite music as a ringtone, depending on his or her taste, or using image data captured by the camera of the mobile phone as the wall paper of the mobile phone.

However, in cordless telephones used in homes, the user is only able to select and use ringtone and wallpaper data from among several pieces which are prepared in advance at the time of purchase.

For example, PTLs 1 and 2 disclose techniques in which a mobile phone is wirelessly connected to different phones such as a cordless telephone slave device which is used in home (a cordless handset) and transfers various data (such as telephone directory data, wallpaper data, and ringtone data), saved in the mobile phone, to the different phones, in order to resolve the complaints of the user. The ringtone data may be sound source data used in the cordless telephone slave device, such as holding tone and guidance messages of an answering machine.

In PTL 1, a phone is described which is coupled with an external storage device (such as a mobile phone) and reads audio files from the external storage device to be able to freely change a ringtone.

In PTL 2, a telephone directory data transfer system is described in which a mobile phone and an extension telephone (or a public switched telephone) are coupled and can transfer telephone directory data to each other.

CITATION LIST

Patent Literature

PTL 1: Japanese Registered Utility Model No. 3116750
PTL 2: Japanese Patent Unexamined Publication No. 2003-101632

SUMMARY OF THE INVENTION

However, it is necessary to provide a host device controller (HDC) in the phone for coupling with the external storage device, in the cordless telephone system described in PTL 1. Then, in a cordless telephone device in which a plurality of cordless telephone slave devices and a master device are coupled, it becomes necessary to provide a new HDC in each cordless telephone slave device, and thus cost is increased.

When the external storage device of PTL 1 is a personal computer or a mobile phone, audio data which is recorded with these devices and saved therein has an audio format such as MPEG Audio Layer-3 (MP3) or a WAV format, and a CODEC of the cordless telephone slave device cannot play the audio data back as it is. Since a CODEC which converts digital audio data of a PCM data format such as G.722 standard, or G.711 standard into analog audio is generally used in the cordless telephone slave device, in a case where audio data of an MP3 or a WAV format is transmitted to the cordless telephone slave device, the cordless telephone slave device needs to convert the format of the audio data so as to be played back in the use CODEC. The execution of the conversion process becomes a factor inducing a processing capacity decrease and a cost increase in each cordless telephone slave device.

Moreover, even in the telephone system described in PTL 2, it is necessary to provide interface means for communicating directly with the cordless telephone slave device and the mobile phone. The telephone directory data or the like of the mobile phone includes image data of a large capacity such as face photographs which are created according to the capacity of a high-precision liquid crystal display of the mobile phone in recent years in addition to the text data such as phone numbers and name information, and thus it is not able to display the image data as it is in the cordless telephone slave device equipped with the liquid crystal device different from the mobile phone. In the mobile phone of high quality, image data (JPEG or the like) of SVGA (800×600 pixels) or XGA (1024×768 pixels) is used. Meanwhile, QVGA (320×240 pixels) or VGA (640×480 pixels) is used in a general cordless telephone slave device. Therefore, in a case where the image data stored in the mobile phone is transmitted to the cordless telephone slave device, it is necessary to re-size the image data to a viewable size on the liquid crystal display unit in the cordless telephone slave device. The execution of the conversion process becomes a factor inducing a processing capacity decrease and a cost increase in each cordless telephone slave device.

In both PTLs 1 and 2, data is not transmitted from a mobile phone through a cordless telephone master device by designating a destination slave device, and it is not possible to meet the user's needs to transmit specific data only to a designated slave device.

An object of the present invention is to provide a cordless telephone device, a cordless telephone system, and a data transfer method, in which the user of a mobile phone is able to store specific data which is stored in the mobile phone, in a designated cordless telephone slave device, in a state of being available in the cordless telephone slave device, without providing a new device in the cordless telephone slave device.

A cordless telephone device according to an aspect of the present invention is a cordless telephone device which includes at least one or more slave devices and a master device thereof, and transfers slave device transfer data including image data or music data, selected by a wireless IP terminal which is wirelessly connected to the master device through a wireless LAN, to the slave devices, the master device includes a wireless IP terminal authentication unit that determines whether or not the wireless IP terminal is connectable to the master device, based on an authentication ID and an authentication password, which are received from the wireless IP terminal; a slave device transfer data receiving unit that receives slave device transfer data from the wireless IP terminal, and stores the received slave device transfer data in a storage unit; a destination slave device determining unit that determines a destination slave device of the slave device transfer data, based on the authentication ID from the wireless IP terminal; a slave device transfer data conversion unit that converts the slave device transfer data into a data format which is available in the destination slave device, based on a data type of the slave device transfer data and conversion format information of the destination slave device; and a slave device transfer data transmitting unit that transmits the slave device transfer data which is converted by the slave device transfer data conversion unit, to all of the destination slave devices which are determined by the destination slave device determining unit.

A cordless telephone system according to another aspect of the present invention is a cordless telephone system which includes a cordless telephone device including at least one or more slave devices and a master device thereof, and a wireless IP terminal which is wirelessly connected to the master device of the cordless telephone device through a wireless LAN, the wireless IP terminal includes a wireless IP terminal authentication request unit that makes a request for connection to the master device, by transmitting an authentication ID and an authentication password to the master device through a wireless LAN; a slave device transfer data selecting unit that selects slave device transfer data to be transferred to the slave device, among data stored in a first storage unit; and a slave device data transmitting unit that transmits the slave device transfer data to the master device, and the master device includes a wireless IP terminal authentication unit that determines whether or not the wireless IP terminal is connectable to the master device, based on the authentication ID and the authentication password, which are received from the wireless IP terminal; a slave device transfer data receiving unit that receives slave device transfer data from the wireless IP terminal, and stores the received slave device transfer data in a second storage unit; a destination slave device determining unit that determines a destination slave device of the slave device transfer data, based on the authentication ID from the wireless IP terminal; and a slave device transfer data transmitting unit that transmits the slave device transfer data, to all of the destination slave devices which are determined by the destination slave device determining unit.

A data transfer method of a cordless telephone device according to further another aspect of the present invention is a data transfer method of a cordless telephone device which includes at least one or more slave devices and a master device thereof, and transfers slave device transfer data including image data or music data, selected by a wireless IP terminal which is wirelessly connected to the master device through a wireless LAN, to the slave devices, the master device executes a wireless IP terminal authentication step of determining whether or not the wireless IP terminal is connectable to the master device, based on an authentication ID and an authentication password, which are received from the wireless IP terminal; a slave device transfer data receiving step of receiving slave device transfer data from the wireless IP terminal, and storing the received slave device transfer data in a storage unit; a destination slave device determining step of determining a destination slave device of the slave device transfer data, based on the authentication ID from the wireless IP terminal; a slave device transfer data conversion step of converting the slave device transfer data into a data format which is available in the destination slave device, based on a data format of the slave device transfer data and conversion format information of the destination slave device; and a slave device transfer data transmitting step of transmitting the slave device transfer data which is converted in the slave device transfer data conversion step, to all of the destination slave devices which are determined in the destination slave device determining step.

A data transfer method of a cordless telephone system according to further still another aspect of the present invention is a data transfer method of a cordless telephone system which includes a cordless telephone device including at least one or more slave devices and a master device thereof, and a wireless IP terminal which is wirelessly connected to the master device of the cordless telephone device through a wireless LAN, the wireless IP terminal transmits an authentication ID and an authentication password to the master device through a wireless LAN, the master device determines whether or not the wireless IP terminal is connectable to the master device, based on an authentication ID and an authentication password, which are received from the wireless IP terminal, the wireless IP terminal selects slave device transfer data to be transferred to the slave device, among data stored in a first storage unit, the wireless IP terminal transmits the slave device transfer data to the master device, the master device receives slave device transfer data from the wireless IP terminal, and stores the received slave device transfer data in a second storage unit, the master device determines a destination slave device of the slave device transfer data, based on the authentication ID from the wireless IP terminal, and the master device transmits the slave device transfer data, to the determined destination slave device.

According to the present invention, since the slave device information that the cordless telephone master device has is transferred to the mobile phone, the user of the mobile phone is able to store specific data which is stored in the mobile phone, based on slave device information, in a designated cordless telephone slave device, in a state of being available in the cordless telephone slave device, without providing a new device in the cordless telephone slave device.

BRIEF DESCRIPTION OF DRAWINGS

FIG. 1 is a schematic diagram illustrating a configuration of a cordless telephone system according to Exemplary Embodiment 1 of the present invention.

FIG. 2 is a block diagram illustrating a configuration of a cordless telephone master device illustrated in FIG. 1.

FIG. 3A is a diagram illustrating an example of a slave device information table according to Exemplary Embodiment 1 of the present invention.

FIG. 12 is a flow chart illustrating a processing procedure of the cordless telephone slave device illustrated in FIG. 4.

FIG. 13 is a diagram illustrating an example of an authentication information table according to Exemplary Embodiment 2 of the present invention.

FIG. 14 is a diagram illustrating an example of a transfer restriction information table according to Exemplary Embodiment 2 of the present invention.

FIG. 15 is a diagram illustrating an example of a slave device information table according to Exemplary Embodiment 2 of the present invention.

FIG. 17 is a diagram illustrating an example of a corresponding authentication ID information table according to Exemplary Embodiment 4 of the present invention.

FIG. 18 is a diagram illustrating an example of a slave device information table according to Exemplary Embodiment 4 of the present invention.

DESCRIPTION OF EMBODIMENTS

Figures 3B, 4:
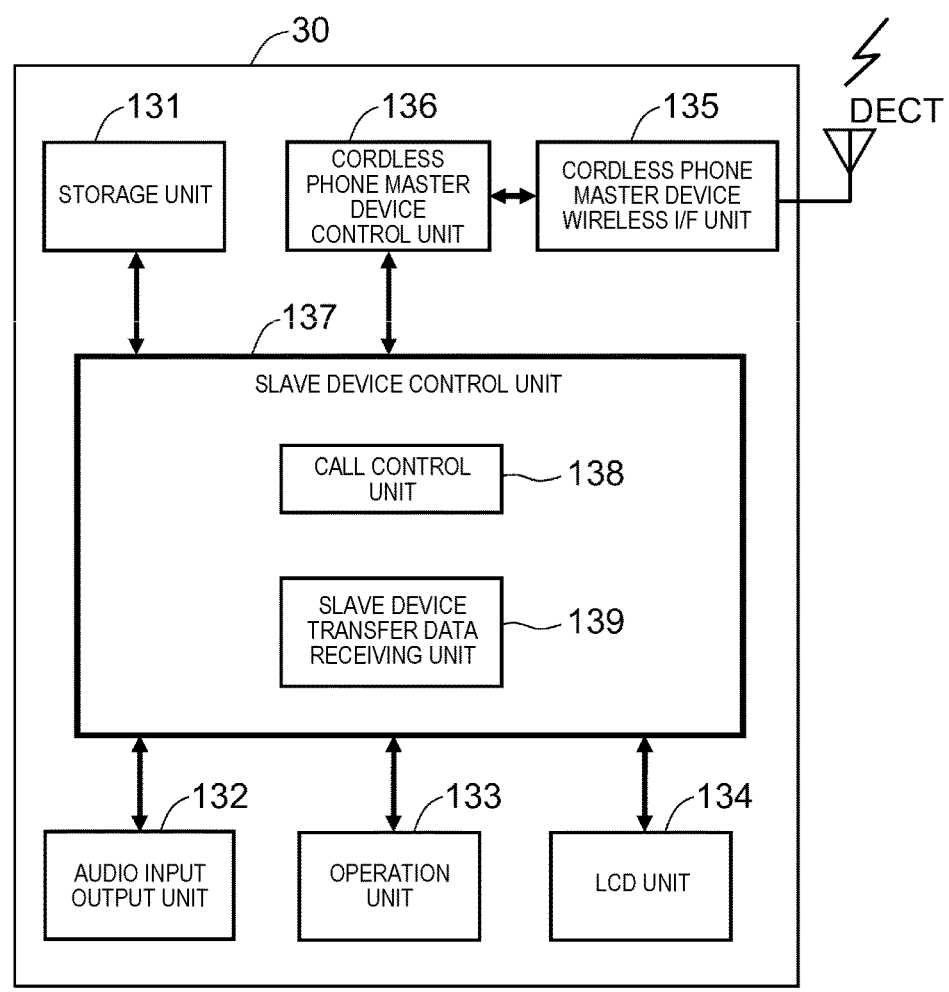
FIG. 3B is a diagram illustrating an example of the slave device information table according to Exemplary Embodiment 1 of the present invention.
FIG. 4 is a block diagram illustrating a configuration of a cordless telephone slave device illustrated in FIG. 1.

Hereinafter, exemplary embodiments of the present invention will be described in detail, with reference to the drawings.

Exemplary Embodiment 1

FIG. 1 is a schematic diagram illustrating a configuration of a cordless telephone system according to Exemplary Embodiment 1 of the present invention. Hereinafter, the configuration of the cordless telephone system will be described with reference to FIG. 1. A wireless IP terminal is exemplified as a mobile phone including a smart phone in the following description, but the present invention is not limited thereto.

In FIG. 1, cordless telephone master device 10 is provided in home, and cordless telephone master device 10 is connected to the Internet through access point 20, while being connected to a fixed telephone network. There are cordless telephone slave devices (CDL slave devices) 30-1 and 30-2 which are connected to cordless telephone master device 10, access point 20 having a wireless LAN router function, and mobile phone 40 connected to a mobile phone network, in home. If there is no distinction particularly, cordless telephone slave devices are generally referred to as cordless telephone slave device 30.

In FIG. 1, cordless telephone slave device 30 is connectable to a fixed telephone network through cordless telephone master device 10, and is connectable to mobile phone 40 through cordless telephone master device 10 and access point 20. Mobile phone 40 is connected to cordless telephone master device 10 and a wireless LAN through access point 20. Mobile phone 40 is connectable to cordless telephone slave device 30 and the fixed telephone network, through access point 20 and cordless telephone master device 10.

In FIG. 1, cordless telephone slave device 30 employs a digital enhanced cordless telecommunications (DECT) system as a wireless communication system between the slave device and the master device, and cordless telephone slave device 30 is connectable to the fixed telephone network and the mobile phone, through cordless telephone master device 10. Mobile phone 40 is connectable to cordless telephone slave device 30 and the fixed telephone network through cordless telephone master device 10, and is also connectable to the Internet through access point 20.

Although FIG. 1 illustrates a case where mobile phone 40 is connected to cordless telephone master device 10 through access point 20, cordless telephone master device 10 has a wireless LAN repeater function, mobile phone 40 is directly connected to cordless telephone master device 10, and can be connected to the Internet from cordless telephone master device 10 through access point 20.

FIG. 2 is a block diagram illustrating a configuration of cordless telephone master device 10 illustrated in FIG. 1. Hereinafter, the configuration of cordless telephone master device 10 will be described with reference to FIG. 2.

Network control unit (NCU) and modem unit 101 includes a network control circuit (NCU) that controls a telephone line, such as the connection with the public line during a call and incoming call detection from the public line, and a modem unit that receives caller number information from the public line during incoming call.

Telephone answering machine (TAM) unit 102 stores an answering machine message, and performs the recording and playback of messages.

Storage unit 103 stores various types of setting data, telephone directory data, call history information, and slave device additional information including the communication history of the slave device such as an SMS message of the cordless telephone device. With respect to the cordless telephone device, there is a case of providing telephone directory data for each cordless telephone slave device 30, and a case of providing telephone directory data which is commonly used in all of cordless telephone slave devices 30. Cordless phone master device 10 stores and manages at least one of telephone directory data provided for each of cordless telephone slave devices 30 and telephone directory data which is commonly used in all of cordless telephone slave devices 30.

Storage unit 103 stores slave device information as illustrated in FIG. 3A. In the slave device information, each cordless telephone slave device 30 (slave device 1 to slave device 6) is associated with the connection state of each cordless telephone slave device 30, a slave device name, a slave device number (a slave device extension number or a port number), wallpaper data information of a slave device (the image format, the number of colors, the image size, or the like), thumbnail data information (the image format, the number of colors, the image size, or the like), ringtone memory information (a memory capacity, or a playback time) and use CODEC. The slave device name and the slave device number are used as the slave device identification information for identifying the slave device. The wallpaper data information, the thumbnail data information, the ringtone memory information and the use CODEC information are used as conversion format information when converting to the data used in the slave device. Cordless phone master device 10 may acquire the afore-mentioned conversion format information, depending on the device capability of each slave device, based on the model information received from the slave device at the time of connection with each cordless telephone slave device 30, or if only a slave device of a single model is connected to the master device, as illustrated in FIG. 3B, cordless telephone master device 10 may uniquely determine and use conversion format information which is used in common by slave devices fixed in a system.

Audio input output unit 104 includes a microphone, a speaker and a CODEC, and performs the output of a ringtone and the input and output of call voice.

Operation unit 105 includes a dial for the user to perform an operation, and various function buttons, and liquid crystal display (LCD) unit 106 displays various types of information.

Cordless phone slave device wireless I/F unit 107 is a circuit for transmitting and receiving wireless data to and from cordless telephone slave device 30, and includes an RF/IF unit that performs frequency conversion of a wireless signal, a modem unit that performs modulation and demodulation, and a digital signal processing circuit that performs a TDMA signal process.

Cordless phone slave device control unit 108 transmits and receives control data to and from cordless telephone slave device 30, and performs protocol control such as making a call and receiving a call according to the control protocol between cordless telephone slave device 30 and cordless telephone master device 10 (for example, a DECT protocol system, a PHS protocol system, or the like). In the following description, it is assumed that the DECT system is employed for the control protocol between cordless telephone slave device 30 and cordless telephone master device 10.

Wireless LAN I/F unit 109 performs wireless LAN protocol control of IEEE.802.11 (Wi-Fi (registered trademark)), and transmits and receives wireless data to and from mobile phone 40. Incidentally, wireless LAN I/F unit 109 may use a short-range wireless communication technique such as Bluetooth (registered trademark) or ZigBee (registered trademark).

Master device control unit 110 controls entire cordless telephone master device 10. Specifically, master device control unit 110 receives and analyzes the event and message, which are generated in respective units in the periphery of master device control unit 110, controls the state of incoming and outgoing calls and call connection, and gives an instruction to each unit. Master device control unit 110 includes call control unit 121, slave device transfer data receiving unit 122, destination slave device determining unit 123, slave device transfer data conversion unit 124, slave device transfer data transmitting unit 125, wireless IP terminal authentication unit 126, and slave device information transmitting unit 127.

Call control unit 121 processes events and various messages which are received from NCU and modem unit 101 and cordless telephone slave device control unit 108.

Slave device transfer data receiving unit 122 receives slave device transfer data from mobile phone 40 through wireless LAN I/F unit 109, and stores the slave device transfer data in storage unit 103.

Destination slave device determining unit 123 extracts destination slave device information from the slave device transfer data stored in storage unit 103, and determines cordless telephone slave device 30 which is a destination of the slave device transfer data, based on the slave device identification information (the slave device name, the slave device extension number or the slave device port number) which is set in the destination slave device information.

Slave device transfer data conversion unit 124 executes a predetermined conversion process, based on the type of the slave device transfer data stored in storage unit 103 and the conversion format information of the destination slave device. Specifically, in a case where the slave device transfer data is ringtone data, slave device transfer data conversion unit 124 converts the audio format of the ringtone data according to the use CODEC of cordless telephone slave device 30 of the slave device information, and converts the size of the ringtone data so as to be within the size (or the maximum playback time) of the ringtone of cordless telephone slave device 30 of slave device information. In a case where the slave device transfer data is wallpaper data, slave device transfer data conversion unit 124 converts the image size of the wallpaper data according to the wallpaper size of cordless telephone slave device 30 of the slave device information. In a case where the slave device transfer data is telephone directory data, slave device transfer data conversion unit 124 converts the image size of the thumbnail data included in the telephone directory data according to the thumbnail size of cordless telephone slave device 30 of the slave device information. The wallpaper data information, the thumbnail data information, the ringtone memory information and the use CODEC information of the slave device information are collectively referred to as conversion format information.

Although only the size conversion of the wallpaper data and the thumbnail data is described in the present exemplary embodiment, the conversion of the image data includes not only the size conversion but also image format conversion. In the following description, the size conversion of an image is used as an example of the conversion of image data, but in the present invention, image data conversion other than the size conversion, for example, conversion from a JPEG format to a BMP format may be performed.

Slave device transfer data transmitting unit 125 transmits slave device transfer data on which the conversion process is executed by slave device transfer data conversion unit 124, to cordless telephone slave device 30 which is selected by destination slave device determining unit 123, through cordless telephone slave device wireless I/F unit 107. The slave device transfer data transmitting unit 125 notifies mobile phone 40 of a message indicating that the conversion process is not performed, or a message indicating that the conversion process is performed.

Wireless IP terminal authentication unit 126 performs the connection authentication of mobile phone 40. Specifically, wireless IP terminal authentication unit 126 receives an authentication request (an authentication ID, and an authentication password) from mobile phone 40 and determines whether or not the combination of the authentication ID and the authentication password which are included in the authentication request matches any one of the combination of the authentication ID and the authentication password of storage unit 103. In a case of match, wireless IP terminal authentication unit 126 authorizes the authentication and transmits an authentication response (OK) to mobile phone 40; and in a case of mismatch, wireless IP terminal authentication unit 126 does not authorize the authentication and transmits an authentication response (NG) to mobile phone 40.

Slave device information transmitting unit 127 transmits the slave device information stored in storage unit 103 (the slave device identification information of FIG. 3A or FIG. 3A and the conversion format information of FIG. 3B), to mobile phone 40 through wireless LAN I/F unit 109.

The conversion format information of the slave device information transmitted to mobile phone 40 may be information on each slave device illustrated in FIG. 3A, and in a case where only slave devices of the same model are connected, the conversion format information may be information which is common to the slave devices which are illustrated in FIG. 3B.

FIG. 4 is a block diagram illustrating a configuration of cordless telephone slave device 30 illustrated in FIG. 1. Below, a description will be given on the configuration of cordless telephone slave device 30 with reference to FIG. 4.

Storage unit 131 stores various data used in cordless telephone slave device 30, such as the ringtone data, the wallpaper data, and the telephone directory data, in a predetermined storage area.

Audio input output unit 132 includes a microphone, a speaker and a CODEC, and performs the output of a ringtone and the input and output of call voice.

Operation unit 133 includes a dial for the user to perform an operation, and various function buttons, and liquid crystal display (LCD) unit 134 displays various types of information.

Cordless phone master device wireless I/F unit 135 is a circuit for transmitting and receiving wireless data to and from cordless telephone master device 10, and includes an RF/IF unit that performs frequency conversion of a wireless signal, a modem unit that performs modulation and demodulation, and a digital signal processing circuit that performs a TDMA signal process.

Cordless phone master device control unit 136 transmits and receives control data to and from cordless telephone master device 10, and performs protocol control such as making a call and receiving a call according to the control protocol between cordless telephone slave device 30 and cordless telephone master device 10 (for example, a DECT protocol system, a PHS protocol system, or the like).

Slave device control unit 137 controls entire cordless telephone slave device 30. Specifically, slave device control unit 137 receives and analyzes the event and message, which are generated in respective units in the periphery of slave device control unit 137, controls the state of incoming and outgoing calls and call connection, and gives an instruction to each unit. Slave device control unit 137 includes call control unit 138 and slave device transfer data receiving unit 139.

Call control unit 138 processes events and various messages which are received from cordless telephone master device control unit 136.

Slave device transfer data receiving unit 139 receives slave device transfer data from cordless telephone master device 10 through cordless telephone master device wireless I/F unit 135, and stores the slave device transfer data in the storage area of storage unit 131 according to the type of the slave device transfer data.

Figure 5:
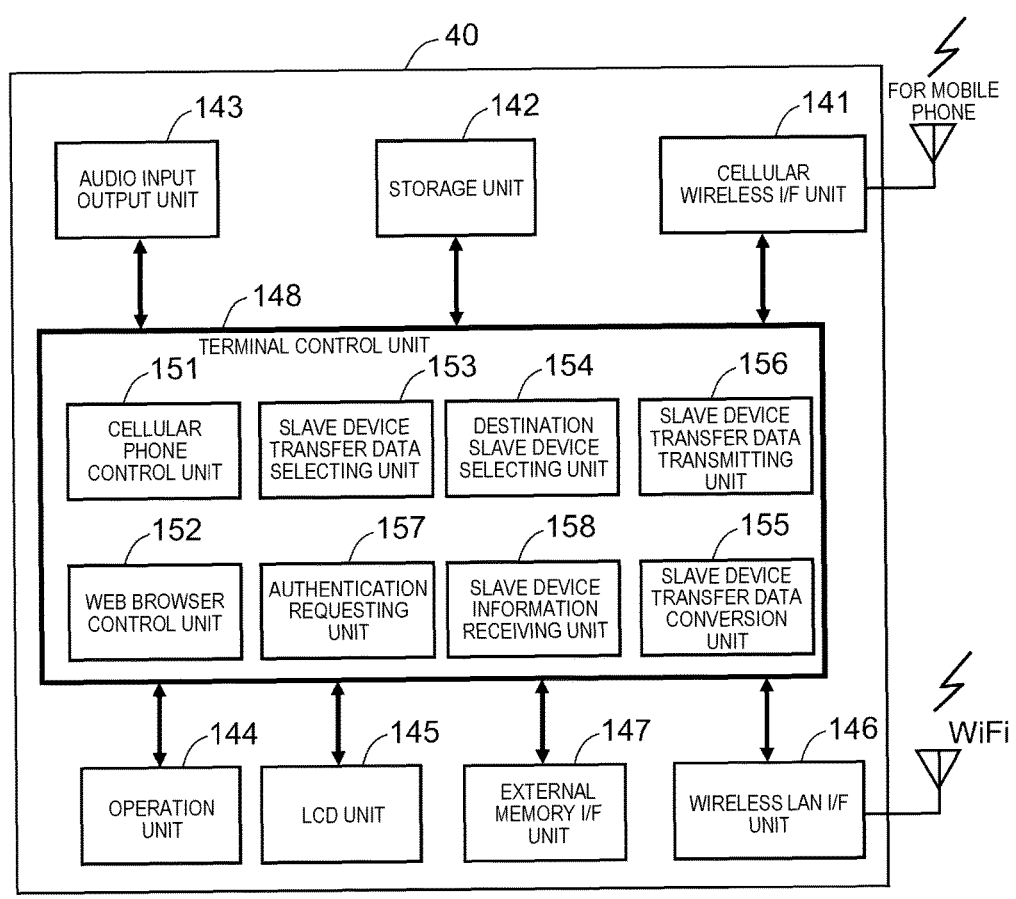
FIG. 5 is a block diagram illustrating a configuration of a mobile phone (wireless IP terminal) illustrated in FIG. 1.

FIG. 5 is a block diagram illustrating a configuration of mobile phone 40 illustrated in FIG. 1. Below, a description will be given on the configuration of mobile phone 40 with reference to FIG. 5.

Cellular wireless I/F unit 141 performs wireless data transmission and reception with the mobile phone base station through a mobile phone antenna.

Storage unit 142 stores information such as various setting data of mobile phone 40, telephone directory data, call history information, an SMS message, various image data (including wallpaper data), music data (including ringtone data).

Audio input output unit 143 includes a microphone and a speaker, and performs the output of a ringtone and the input and output of call voice.

Operation unit 144 includes a dial for the user to perform an operation, and various function buttons, and LCD unit 145 displays various types of information. The touch panel of a smart phone may form operation unit 144 and LCD unit 145.

Wireless LAN I/F unit 146 performs wireless LAN protocol control of IEEE.802.11, and transmits and receives wireless data to and from cordless telephone master device 10. Wireless LAN I/F unit 146 may use a short-range wireless communication technique such as Bluetooth (registered trademark) or ZigBee (registered trademark), according to cordless telephone master device 10.

External memory I/F unit 147 has a shape in which an external memory such as an SD card is removable and attachable, and reads/writes data to and from the mounted external memory.

Terminal control unit 148 controls entire mobile phone 40. Specifically, terminal control unit 148 receives and analyzes the event and message, which are generated in respective units in the periphery of terminal control unit 148, controls the state of incoming and outgoing calls and call connection, and gives an instruction to each unit. Terminal control unit 148 includes cellular phone control unit 151, Web browser control unit 152, slave device transfer data selecting unit 153, destination slave device selecting unit 154, and slave device transfer data transmitting unit 156.

Cellular phone control unit 151 processes a call control message received from cellular wireless I/F unit 141.

Web browser control unit 152 performs control so as to download HTML files, image files, music files, and the like from the Internet through cellular wireless I/F unit 141 or wireless LAN I/F unit 146, and display and play the down loaded files back while analyzing a Web screen layout.

Slave device transfer data selecting unit 153 selects data (slave device transfer data) to be transferred to cordless telephone slave device 30, from a data group stored in storage unit 142, based on a user's operation from operation unit 144 (including LCD unit 145), and outputs the selected data to slave device transfer data transmitting unit 156.

Destination slave device selecting unit 154 selects cordless telephone slave device 30 which is a destination of data, based on a user's operation from operation unit 144 (including LCD unit 145), and outputs the selected data to slave device transfer data transmitting unit 156. Destination slave device selecting unit 154 is able to select one or a plurality of cordless telephone slave devices 30.

Slave device transfer data conversion unit 155 executes a predetermined conversion process, on slave device transfer data which is output from slave device transfer data selecting unit 153, based on the type of the slave device transfer data and the conversion format information. Specifically, in a case where the slave device transfer data is ringtone data, slave device transfer data conversion unit 155 converts the audio format of the ringtone data according to the use CODEC of cordless telephone slave device 30, and converts the size of the ringtone data so as to be within the size (or the maximum playback time) of the ringtone of cordless telephone slave device 30 of slave device information. In a case where the slave device transfer data is wallpaper data, slave device transfer data conversion unit 155 converts the image size of the wallpaper data into the wallpaper size of cordless telephone slave device 30. In a case where the slave device transfer data is telephone directory data, slave device transfer data conversion unit 155 converts the image size of the thumbnail data of the slave device transfer data into the thumbnail size of cordless telephone slave device 30.

Slave device transfer data transmitting unit 156 edits the slave device transfer data on which slave device transfer data conversion unit 155 executes a conversion process. Specifically, slave device transfer data transmitting unit 156 generates the header portion of the slave device transfer data, and sets the destination slave device identification information (the slave device name, the slave device extension number or the slave device port number) indicating cordless telephone slave device 30 which is selected by destination slave device selecting unit 154, in the destination slave device information of the slave device transfer data message of the header portion. Slave device transfer data transmitting unit 156 transmits the edited slave device transfer data to cordless telephone master device 10, through wireless LAN I/F unit 146.

Authentication requesting unit 157 transmits an authentication request for connection, to cordless telephone master device 10 through wireless LAN I/F unit 146.

Slave device information receiving unit 158 receives slave device information (the slave device identification information of FIG. 3A or FIG. 3A, or the conversion format information of FIG. 3B) from cordless telephone master device 10 though wireless LAN I/F unit 146, and stores the slave device information in storage unit 142.

Next, a processing procedure up to the storage of the slave device information that is stored in cordless telephone master device 10, in mobile phone 40 will be described with reference to FIG. 6, FIG. 7, FIG. 8 and FIG. 9.

Figure 6:
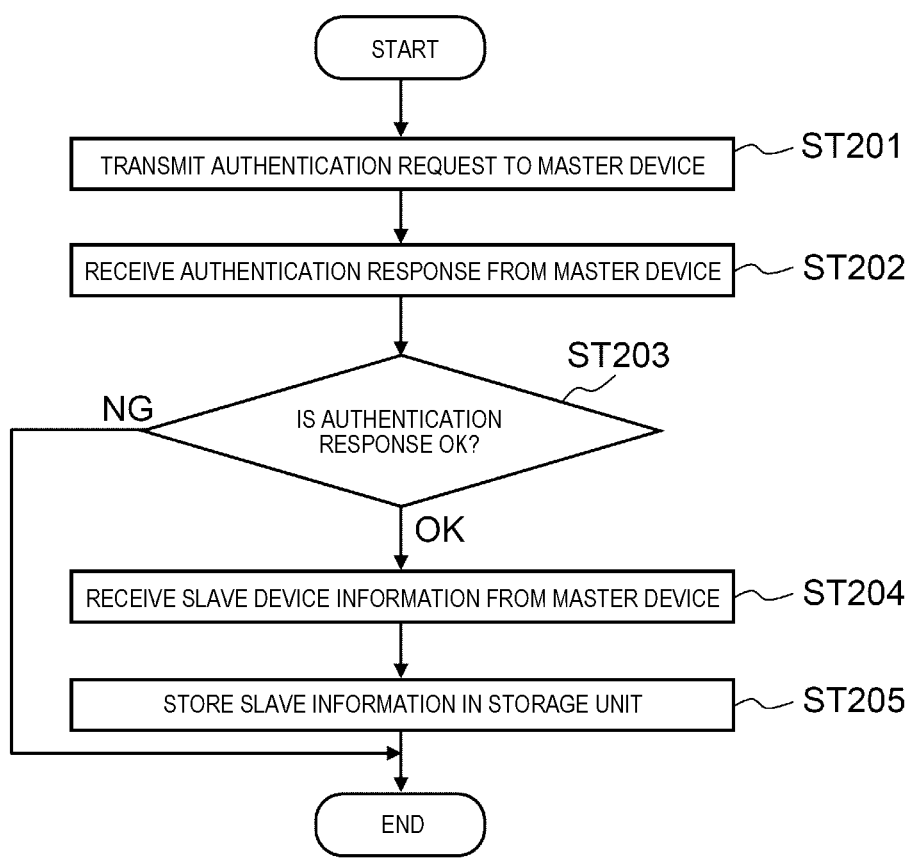
FIG. 6 is a flow chart illustrating a processing procedure at the time of connection authentication of a mobile phone illustrated in FIG. 5.

FIG. 6 is a flow chart illustrating a processing procedure at the time of connection authentication of mobile phone 40. First, in ST201, authentication requesting unit 157 transmits an authentication request to cordless telephone master device 10, based on the user's operation of operation unit 144 (including LCD unit 145).

Next, in ST202, authentication requesting unit 157 receives an authentication response from cordless telephone master device 10.

Then, in a case where the authentication response is OK (ST203: OK), in ST204 and ST205, slave device information receiving unit 158 receives slave device information from cordless telephone master device 10, and stores the slave device information in storage unit 142. In contrast, in a case where the authentication response is NG (ST203: NG), the flow ends.

Figure 7:
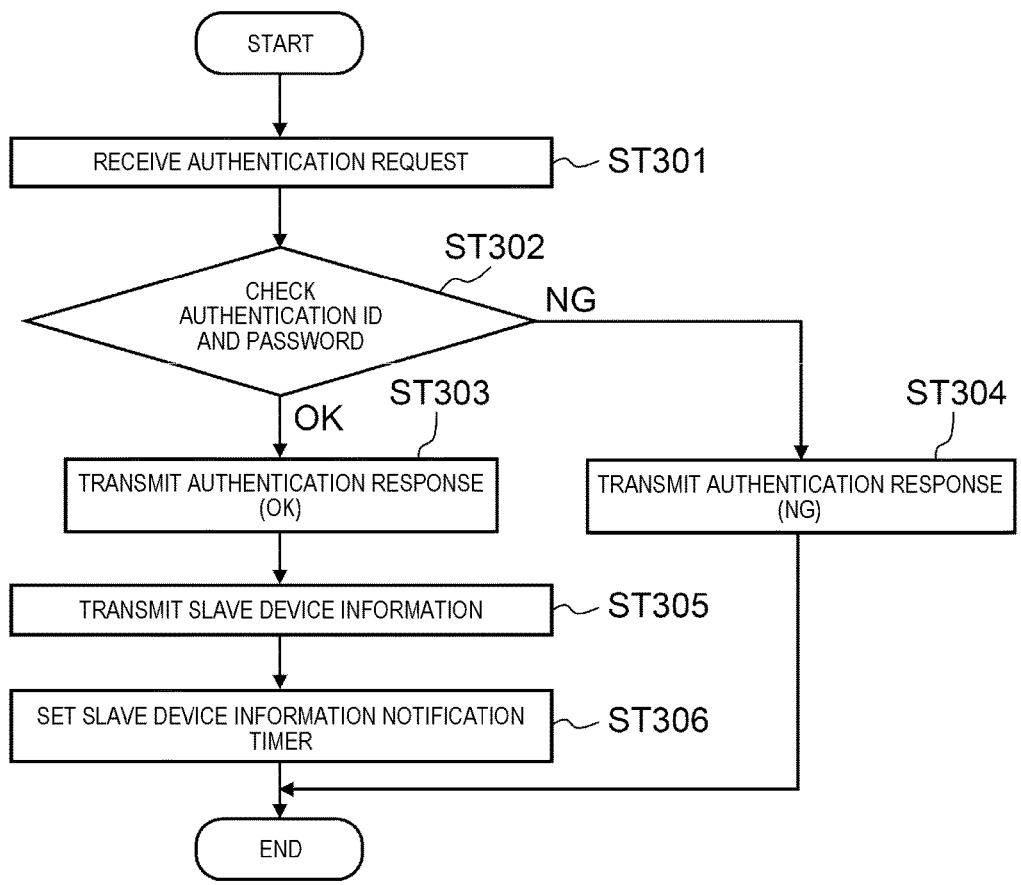
FIG. 7 is a flow chart illustrating a processing procedure at the time of the connection authentication of the cordless telephone master device illustrated in FIG. 2.

FIG. 7 is a flow chart illustrating a processing procedure at the time of connection authentication of cordless telephone master device 10. First, in ST301, wireless IP terminal authentication unit 126 receives an authentication request from mobile phone 40.

Next, in ST302, wireless IP terminal authentication unit 126 checks the authentication ID and the authentication password which are included in the authentication request.

If the authentication is confirmed (ST302: OK), wireless IP terminal authentication unit 126 transmits an authentication response (OK) to mobile phone 40 in ST303. In contrast, if authentication is not confirmed (ST302: NG), wireless IP terminal authentication unit 126 transmits an authentication response (NG) to mobile phone 40 in ST304.

After ST303, slave device information transmitting unit 127 transmits slave device information to mobile phone 40, and sets a slave device information notification timer, respectively in ST305 and ST306.

Figure 8:
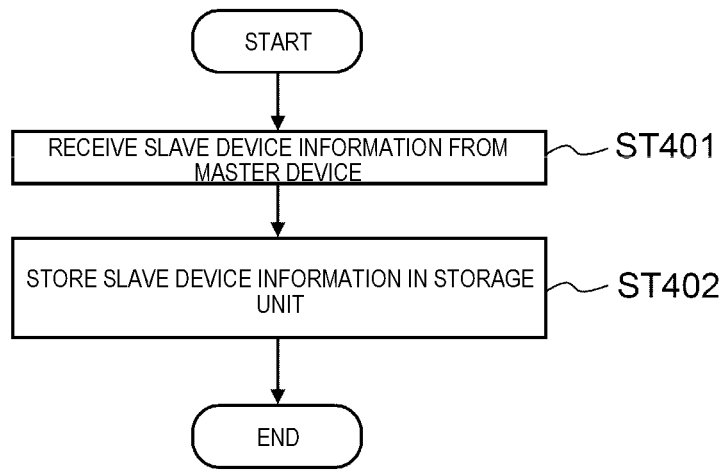
FIG. 8 is a flow chart illustrating a processing procedure after connection authentication of the mobile phone illustrated in FIG. 5.

FIG. 8 is a flow chart illustrating a processing procedure after connection authentication of mobile phone 40. After connection authentication, slave device information receiving unit 158 receives slave device information from cordless telephone master device 10, and stores the slave device information in storage unit 142, respectively in ST401 and ST402.

Figure 9:
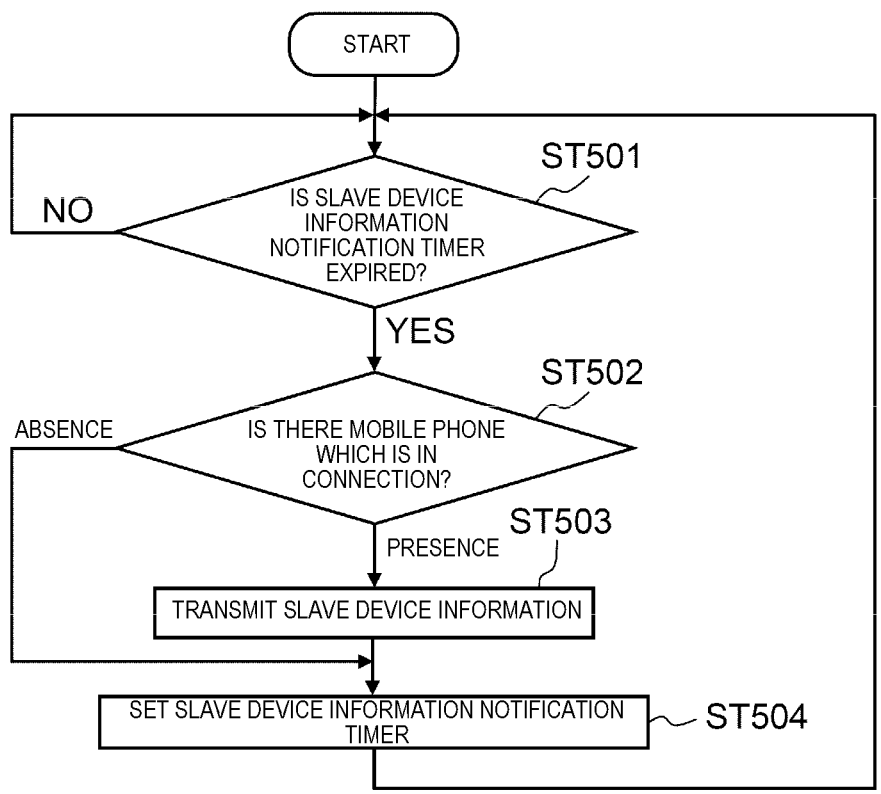
FIG. 9 is a flow chart illustrating a processing procedure after the connection authentication of the cordless telephone master device illustrated in FIG. 2.

FIG. 9 is a flow chart illustrating a processing procedure after connection authentication of cordless telephone master device 10. After the connection authentication, in ST501 and ST502, each time a slave device information notification timer expires, slave device information transmitting unit 127 determines whether or not there is mobile phone 40 which is in connection with cordless telephone master device 10.

If there is mobile phone 40 which is in connection (ST502: YES), slave device information transmitting unit 127 transmits slave device information to mobile phone 40, and sets the slave device information notification timer, respectively in ST503 and ST504. In contrast, if there is no mobile phone 40 which is in connection (ST502: NO), slave device information transmitting unit 127 sets the slave device information notification timer in ST504.

Next, a processing procedure up to the storage of various data (telephone directory data, wallpaper data, and ringtone data) which are stored in mobile phone 40 in cordless telephone slave device 30, in a state available in cordless telephone slave device 30 will be described with reference to FIG. 10 to FIG. 12.

Figure 10:
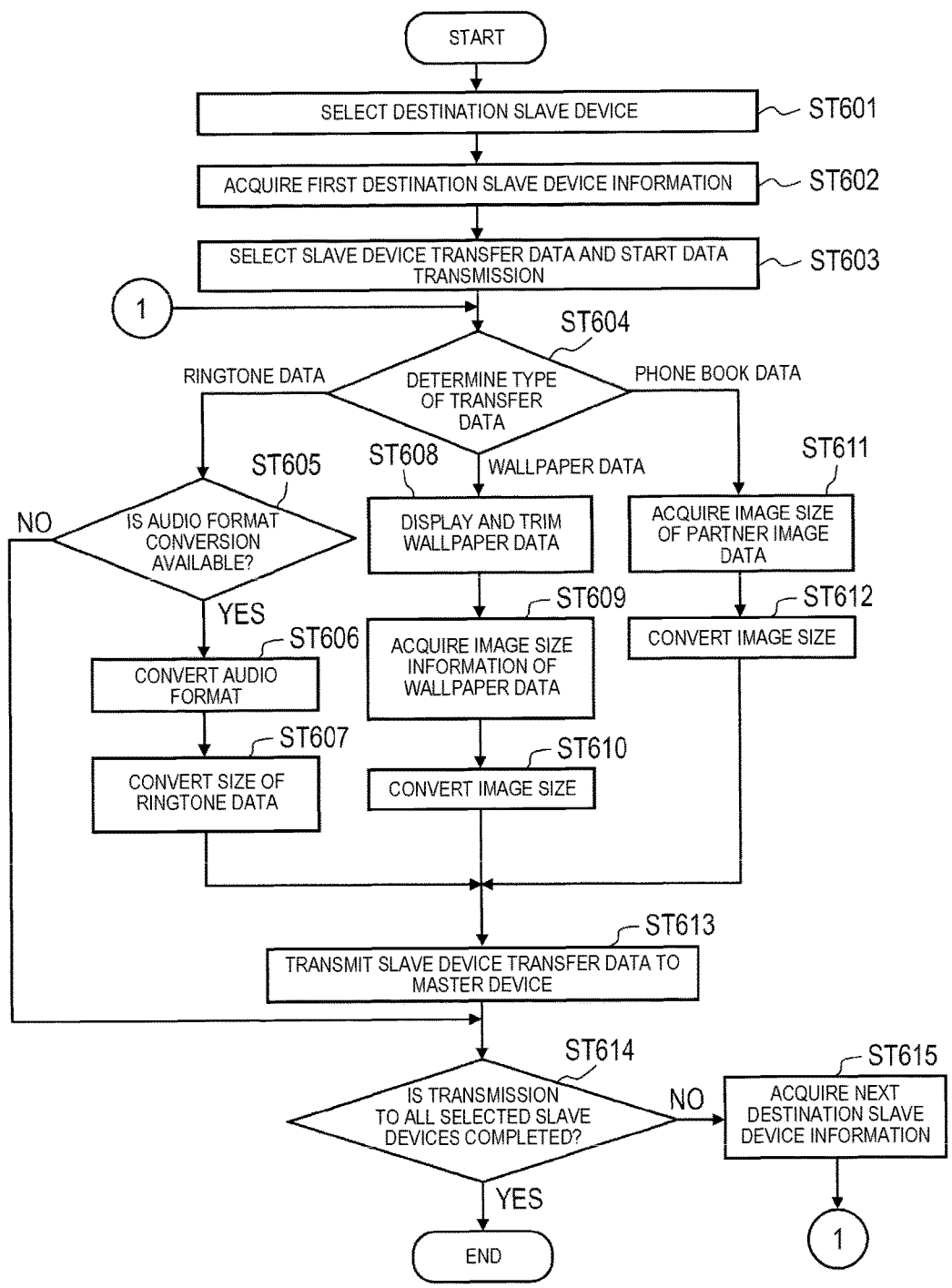
FIG. 10 is a flow chart illustrating a processing procedure of the mobile phone illustrated in FIG. 5.

FIG. 10 is a flow chart illustrating a processing procedure at the time of data transfer of mobile phone 40. First, in ST601, destination slave device selecting unit 154 selects one or a plurality of cordless telephone slave devices 30 which are data destinations (a destination slave devices), based on the user's operation of operation unit 144 (including LCD unit 145). In ST602, destination slave device selecting unit 154 acquires slave device information on a first destination slave device. Destination slave device selecting unit 154 displays the selected slave device identification information (a slave device name or a slave device number) on LCD unit 145, based on the slave device information which is previously received from cordless telephone master device 10, and is able to select one or a plurality of cordless telephone slave devices 30 among the plurality of slave devices, based on the user's instruction.

Next, in ST603, slave device transfer data selecting unit 153 selects data (slave device transfer data) to be transferred to cordless telephone slave device 30 from among various data groups (telephone directory data, wallpaper data, ringtone data, and the like) which are stored in storage unit 142, based on the user's operation of operation unit 144 (including LCD unit 145), and starts data transmission to the slave device which is selected in ST601.

Next, in ST604, slave device transfer data conversion unit 155 determines the type of slave device transfer data which is stored in storage unit 142.

Then, in a case where the slave device transfer data is ringtone data (ST604: "ringtone data"), slave device transfer data conversion unit 155 determines whether or not the slave device transfer data is ringtone data for which format conversion is available in cordless telephone slave device 30 in ST605.

In a case where format conversion is available (ST605: YES), in ST606, slave device transfer data conversion unit 155 converts the audio format of the slave device transfer data (ringtone data) according to use CODEC present in the slave device information on cordless telephone slave device 30. In ST607, slave device transfer data conversion unit 155 converts the size of the ringtone data according to the size of the ringtone of cordless telephone slave device 30 of the slave device information. Thereafter, the flow proceeds to ST613. In contrast, in a case where the format conversion is not available (ST605: NO), the flow proceeds to ST614.

In a case where the slave device transfer data is wallpaper data (ST604: "wallpaper data"), in ST608, slave device transfer data conversion unit 155 displays the wallpaper data, and performs a processing process such as trimming as necessary. Next, in ST609, slave device transfer data conversion unit 155 acquires image size information from the header portion of the slave device transfer data. In ST610, slave device transfer data conversion unit 155 acquires the image size of the slave device transfer data (wallpaper data) from the slave device information, and converts the image size of the slave device transfer data so as to be played back in cordless telephone slave device 30. Thereafter, the flow proceeds to ST613.

In a case where the slave device transfer data is telephone directory data (ST604: "telephone directory data"), slave device transfer data conversion unit 155 acquires image size information of the thumbnail data (partner image data) from the header portion of the slave device transfer data in ST611. In ST612, slave device transfer data conversion unit 155 acquires the image size of the thumbnail data of the slave device transfer data from the slave device information, and converts the image size of the thumbnail data so as to be played back in cordless telephone slave device 30. Thereafter, the flow proceeds to ST613.

In ST613, slave device transfer data transmitting unit 156 edits the slave device transfer data which is output from destination slave device selecting unit 154, and transmits the edited slave device transfer data to cordless telephone master device 10 through wireless LAN IT unit 146. In the editing, slave device transfer data transmitting unit 156 sets a transfer data type (telephone directory data, wallpaper data, or ringtone data), and destination slave device identification information indicating cordless telephone slave device 30 selected by slave device transfer data selecting unit 153 in the header portion of the slave device transfer data, and edits a transfer data body portion (a ringtone data portion, an image data portion, and a telephone directory data portion).

Through the process of ST605 or ST613, in a case where data transmission to all cordless telephone slave devices 30 selected by destination slave device selecting unit 154 is completed (ST614: YES), the flow ends. In contrast, after the process of ST613, in a case where the data transmission to any cordless telephone slave devices 30 selected by destination slave device selecting unit 154 is not completed (ST614: NO), destination slave device selecting unit 154 acquires the slave device information of the next data destination slave device in ST615. Thereafter, the flow proceeds to ST604.

Although an example of a flow of selecting slave device transfer data for each destination slave device and transmitting the slave device transfer data is illustrated in the flow chart of FIG. 10, cordless telephone master device 10 may be instructed to transfer the slave device transfer data to a plurality of slave device, through one time of transmission of slave device transfer data, by selecting the plurality of destination slave devices and transmitting slave device transfer data obtained by editing the destination slave device information so as to include the plurality of pieces of slave device identification information. After transfer data is selected first, a destination slave device may be selected (a plurality of devices can be selected), and slave device transfer data may be transferred.

Figure 11:
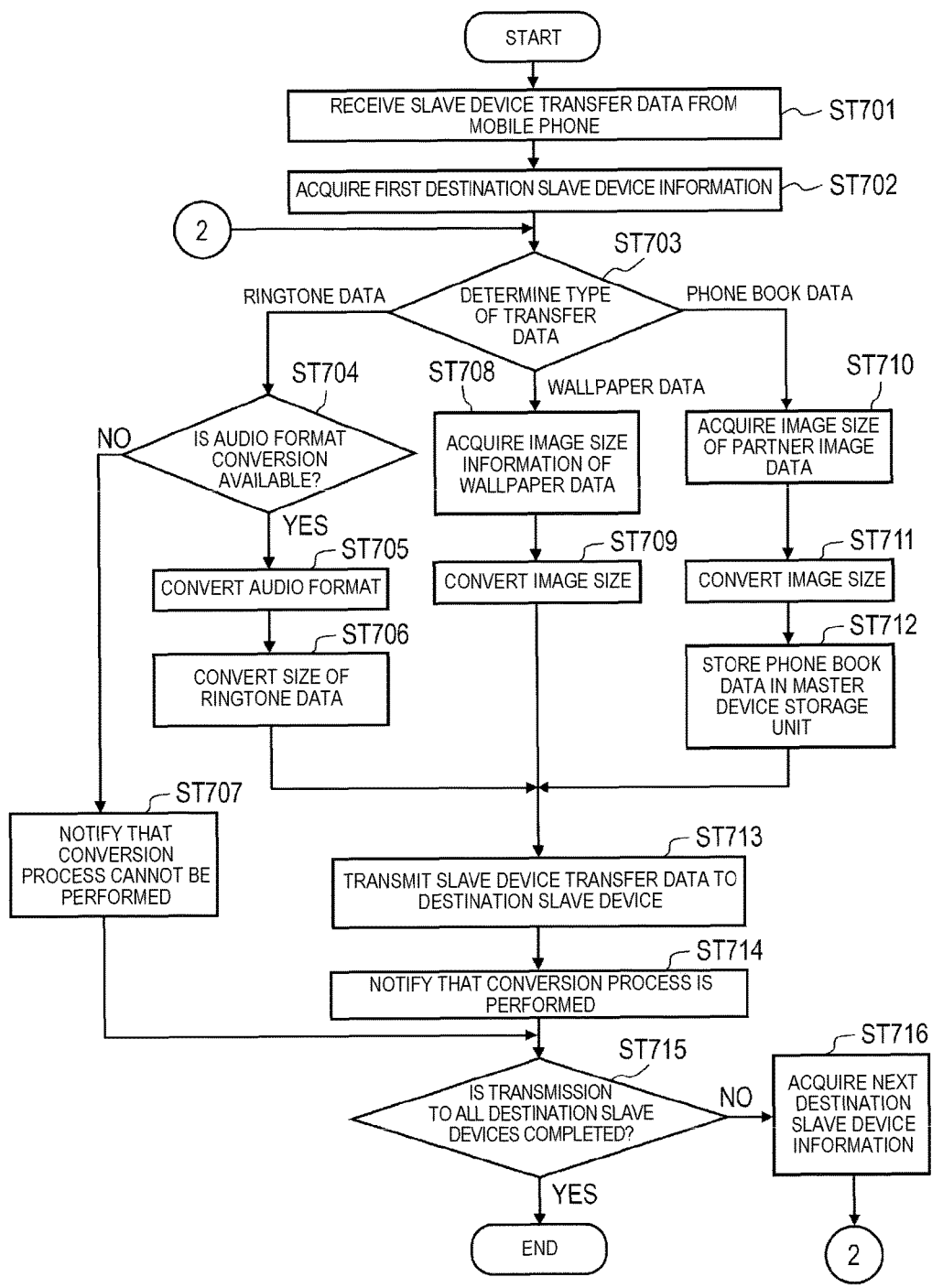
FIG. 11 is a flow chart illustrating a processing procedure of the cordless telephone master device illustrated in FIG. 2.

FIG. 11 is a flow chart illustrating a processing procedure at the time of data transfer of cordless telephone master device 10. First, in ST701, slave device transfer data receiving unit 122 receives slave device transfer data from mobile phone 40 through wireless LAN I/F unit 109, and stores the received data in storage unit 103.

Next, in ST702, destination slave device determining unit 123 extracts the first destination slave device information from the slave device transfer data stored in storage unit 103, and selects cordless telephone slave device 30 which is a destination of the slave device transfer data, based on the destination slave device identification information which is set in the destination slave device information.

Next, in from ST703 to ST711, slave device transfer data conversion unit 124 performs a predetermined conversion process according to the type of slave device transfer data.

Specifically, first, in ST703, slave device transfer data conversion unit 124 determines the type of the slave device transfer data stored in the storage unit 103.

In a case where the slave device transfer data is the ringtone data (ST703; "ringtone data"), slave device transfer data conversion unit 124 determines whether or not the slave device transfer data is ringtone data for which format conversion is possible in cordless telephone slave device 30 in ST704. For example, in a case where the audio format of the ringtone data of the slave device transfer data is the MPEG Audio Layer-3 (MP3) or the WAV format, slave device transfer data conversion unit 124 determines that format conversion is possible; and in a case of other audio formats, slave device transfer data conversion unit 124 determines that format conversion is not possible.

In a case where format conversion is possible (ST704; YES), slave device transfer data conversion unit 124 converts the audio format of the slave device transfer data (ringtone data) according to the use CODEC of cordless telephone slave device 30, in ST705. For example, format conversion is performed from MP3 to a format in which playback is possible in the G.722. In ST706, slave device transfer data conversion unit 124 converts the size of the ringtone data to be in the size of the ringtone of cordless telephone slave device 30 of the slave device information. Thereafter, the flow proceeds to ST713.

In contrast, in a case where the format conversion is not possible (ST704: NO), slave device transfer data transmitting unit 125 notifies mobile phone 40 of a message indicating that the conversion process cannot be performed in ST707. Thereafter, the flow proceeds to ST715.

In a case where the slave device transfer data is wallpaper data (ST703: "wallpaper data"), slave device transfer data conversion unit 124 acquires image size information from the image data header portion (for example, a BMP header portion, or the like) of the slave device transfer data in ST708. In ST709, slave device transfer data conversion unit 124 converts the image size of the slave device transfer data (wallpaper data) so as to be played back in cordless telephone slave device 30. For example, if the size information on the image data transmitted from mobile phone 40 is XGA (1024×768 pixel) size and the size of image data that can be displayed on cordless telephone slave device 30 is QVGA (320×240 pixel) size, an image size conversion process to XGA into QVGA size is performed. Thereafter, the flow proceeds to ST713.

In a case where the slave device transfer data is the telephone directory data (ST703: "telephone directory data"), slave device transfer data conversion unit 124 acquires image size information of the thumbnail data from the header portion of the slave device transfer data in ST710. In ST711, slave device transfer data conversion unit 124 converts the image size of the thumbnail data of the slave device transfer data so as to be played back in cordless telephone slave device 30, similar to the afore-mentioned wallpaper data.

Next, in ST712, slave device transfer data transmitting unit 125 stores the slave device transfer data (telephone directory data) on which the conversion process is performed by slave device transfer data conversion unit 124, in storage unit 103. Thereafter, the flow proceeds to ST713.

After the process of ST706, ST709, or ST712, slave device transfer data transmitting unit 125 transmits the slave device transfer data on which the conversion process is performed by slave device transfer data conversion unit 124, to cordless telephone slave device 30 which is selected by destination slave device determining unit 123, through cordless telephone slave device wireless IT unit 107, in ST713. In ST714, slave device transfer data transmitting unit 125 notifies mobile phone 40 of the message indicating that the conversion process is performed.

Through the process of ST707 or ST714, in a case where the data transmission to all cordless telephone slave devices 30 which are determined by destination slave device determining unit 123 is completed (ST715: YES), the flow ends. In contrast, after the process of ST707 or ST714, in a case where the data transmission to any cordless telephone slave device 30 which is determined by destination slave device determining unit 123 is not completed (ST715: NO), destination slave device determining unit 123 extracts the next destination slave device information from the slave device transfer data stored in storage unit 103, and selects cordless telephone slave device 30 which is a destination of the slave device transfer data, based on the destination slave device identification information which is set in the destination slave device information in ST716. Thereafter, the flow proceeds to ST703.

FIG. 12 is a flow chart illustrating a processing procedure at the time of data transfer of cordless telephone slave device 30. First, in ST801, slave device transfer data receiving unit 139 receives the slave device transfer data from cordless telephone master device 10, through cordless telephone master device wireless I/F unit 135.

Next, in ST802, slave device transfer data receiving unit 139 stores the slave device transfer data in the storage area of storage unit 131, according to the type of slave device transfer data.

Although the case where the conversion process for the slave device transfer data is performed in both cordless telephone master device 10 and mobile phone 40 is described in the above description, without the present invention being limited thereto, the conversion process for the slave device transfer data may be performed only by one of cordless telephone master device 10 and mobile phone 40. Although the selection of the ringtone data and the conversion process are described in the above description, it is possible to perform the same process as in the ringtone data on the sound source data such as holding tone data and a guidance messages of an answering machine, which are used in cordless telephone slave device 30, in the present invention.

Although the conversion process of the image size is described as an example of the conversion process of the wallpaper image data and the thumbnail data in the above description, the conversion of the image format as well as the size may be performed as the conversion of the image data in the present invention.

In the present invention, it is also possible to distribute the conversion process function such that cordless telephone master device 10 performs the conversion process on some types of slave device transfer data and mobile phone 40 performs the conversion process on other types of slave device transfer data. For example, cordless telephone master device 10 performs the conversion process of the ringtone data of which the data capacity is small and the processing load is light, and mobile phone 40 performs the conversion process of the image data of which the data capacity is large and the processing load is heavy.

In a case where the ringtone data is included in the slave device transfer data, cordless telephone slave device 30 can play the ringtone data back as it is by using the use CODEC. In a case where the wallpaper data is included in the slave device transfer data, cordless telephone slave device 30 can display the wallpaper data as it is on the liquid crystal display unit. In a case where the telephone directory data is included in the slave device transfer data, cordless telephone slave device 30 can display the thumbnail data corresponding to the telephone number information included in the telephone directory data, as it is, on the liquid crystal display unit. Cordless phone master device 10 can store the telephone directory data in the storage unit, and use it as the telephone directory data that its own device (master device) manages.

In this manner, in Exemplary Embodiment 1, since slave device information that cordless telephone master device 10 has is transferred to mobile phone 40, the user of mobile phone 40 can display and select the destination slave device of the slave device transfer data based on the slave device information, and can store the specific data that is stored in mobile phone 40 in designated cordless telephone slave device 30 in the state available in the cordless telephone slave device 30.

Exemplary Embodiment 2

In the present exemplary embodiment 2, a description is made on a case where cordless telephone master device 10 only notifies mobile phone 40 of the information on the slave device to which the slave device transfer data can be transferred, depending on connected mobile phone 40, and restricts the destination slave device of the slave device transfer data, when transferring slave device information to mobile phone 40. The present exemplary embodiment is different from Exemplary Embodiment 1 in that having different functions of storage unit 103 and slave device information transmitting unit 127 of cordless telephone master device 10.

As illustrated in an authentication information table of FIG. 13, storage unit 103 stores information about combination of authentication IDs and authentication passwords of respective mobile phones 40 (wireless IP terminals 1 to 6) (hereinafter, referred to as "authentication information").

When receiving an authentication request (authentication ID and authentication password) from mobile phone 40, wireless IP terminal authentication unit 126 determines whether or not the combination of the authentication ID and the authentication password, which is included in the authentication request, matches any of the combinations of the authentication IDs and the authentication passwords of the authentication information. If they match, wireless IP terminal authentication unit 126 authorizes the authentication, and transmits an authentication response (OK) to mobile phone 40; and if they do not match, wireless IP terminal authentication unit 126 does not authorize the authentication, and transmits an authentication response (NG) to mobile phone 40.

In addition, in the present exemplary embodiment, as illustrated in a transfer restriction information table of FIG. 14, storage unit 103 stores information for restricting the transfer of the slave device transfer data to the slave device from mobile phone 40 to be connected (hereinafter, referred to as "transfer restriction information"). In the transfer restriction information, with respect to each of cordless telephone slave devices 30 (slave device 1 to slave device 6), the presence or absence of a regulation in the transfer of the slave device transfer data to each cordless telephone slave device 30 is associated with the authentication ID of the wireless IP terminal (mobile phone 40) for which the transfer of the slave device transfer data is permitted if the transfer regulation is present. If there is no transfer regulation, as illustrated in FIG. 13, cordless telephone master device 10 permits the transfer of the slave device transfer data from any of mobile phones 40 (wireless IP terminals 1 to 4) for which the connection to cordless telephone master device 10 is permitted.

In the present exemplary embodiment, slave device information transmitting unit 127 transmits only slave device information for which the transfer is permitted, among slave device information stored in storage unit 103, to mobile phone 40, through wireless LAN I/F unit 109, by referring to the transfer restriction information.

For example, slave device information transmitting unit 127 transmits to wireless IP terminal 1, the slave device information of slave devices 1 and 5 in which there is the transfer regulation and the authentication ID "11111111" of wireless IP terminal 1 is registered, and the slave device information of slave devices 3 and 4 in which there is no transfer regulation.

As a result, as illustrated in FIG. 15, slave device information receiving unit 158 of wireless IP terminal 1 stores the slave device information about slave devices 1, 3, 4, and 5, in storage unit 142.

Figure 16:
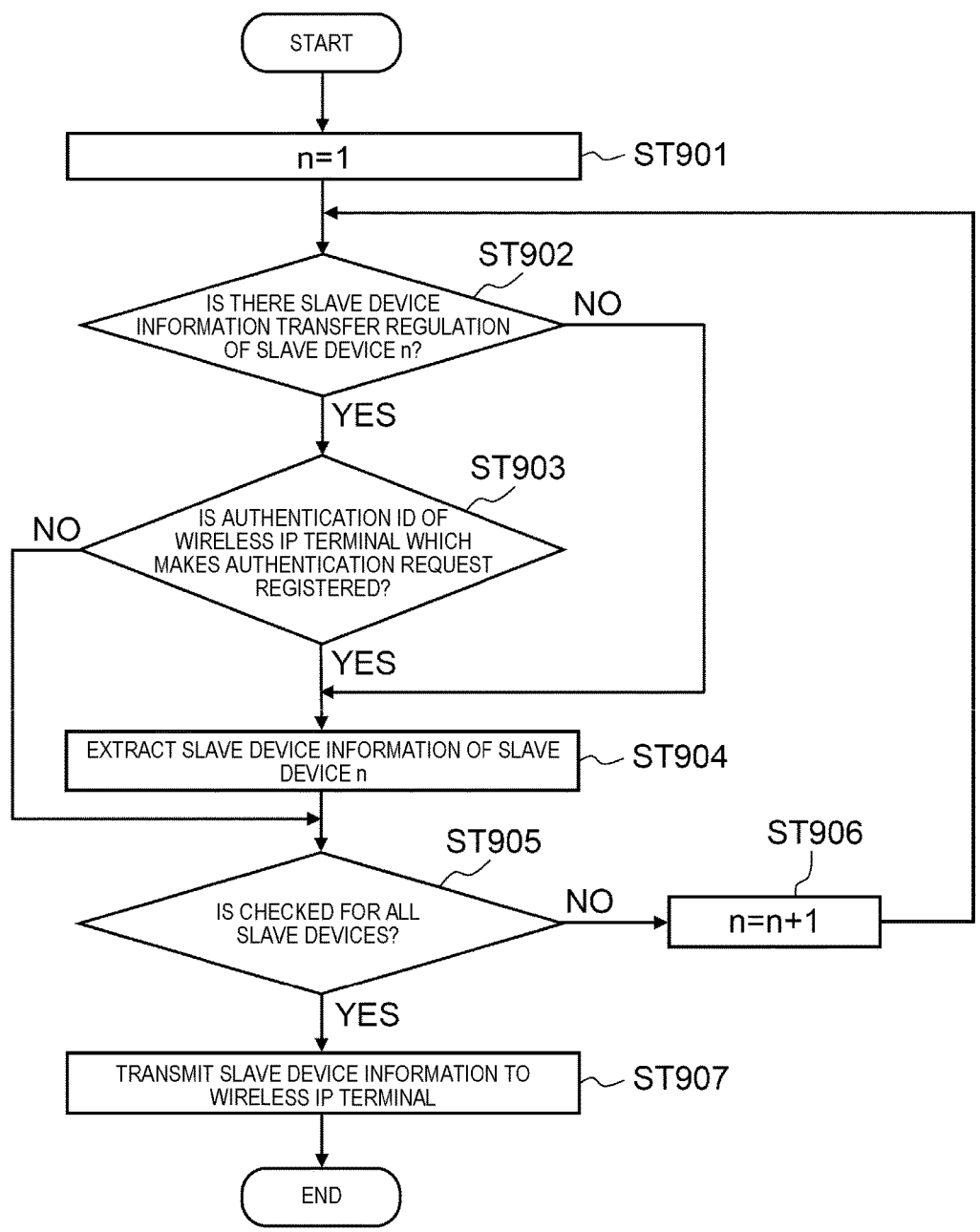
FIG. 16 is a flow chart illustrating a transmission procedure of slave device information by a cordless telephone master device according to Exemplary Embodiment 2 of the present invention.

Next, a transmission procedure of slave device information of cordless telephone master device 10 according to the present exemplary embodiment will be described with reference to the flow chart of FIG. 16.

First, in ST901 and 902, cordless telephone master device 10 checks the presence or absence of the regulation in the transfer of the slave device information to slave device 1, with reference to the transfer regulation information table.

When there is a transfer regulation (ST902: YES), cordless telephone master device 10 checks whether or not the authentication ID of the wireless IP terminal, which makes an authentication request, is registered in slave device 1, with reference to the transfer restriction information table, in ST903.

When there is no transfer regulation (ST902: NO), or the authentication ID is registered (ST903: YES), cordless telephone master device 10 extracts the slave device information of slave device 1 in ST904. The flow proceeds to ST905.

Meanwhile, when the transfer regulation is present (ST902: YES) and the authentication ID is not registered (ST903: NO), cordless telephone master device 10 does not extract the slave device information of slave device 1. The flow proceeds to ST905.

Thereafter, cordless telephone master device 10 repeats the process from ST902 to ST904 for another slave device (ST905: NO, and ST906).

At the stage of performing the process from ST902 to ST904 for all slave devices (ST905: YES), cordless telephone master device 10 transmits the extracted slave device information, to the wireless IP terminal which makes an authentication request (ST907).

As described above, according to Exemplary Embodiment 2, when transferring the slave device information to mobile phone 40, cordless telephone master device 10 can regulate the transfer of some piece of slave device information, depending on a predetermined condition. Mobile phone 40 is able to recognize cordless telephone slave device 30 to which data can be transferred, and the slave device information. When the user of mobile phone 40 intends to select a destination slave device by using operation unit 144 of mobile phone 40, since the slave device identification information of the slave device information, which is transmitted from cordless telephone master device 10, is displayed on LCD unit 145, the user is able to select a destination slave device among slave devices to which data can be transferred.

Exemplary Embodiment 3

In Exemplary Embodiment 3, a description will be given on a case where cordless telephone master device 10 restricts the transfer to some slave devices depending on a predetermined condition when transferring the slave device transfer data to cordless telephone slave device 30. The present exemplary embodiment is different from Exemplary Embodiment 1 in that having different functions of storage unit 103 and destination slave device determining unit 123 of cordless telephone master device 10.

Even in the present exemplary embodiment, as in Exemplary Embodiment 2, storage unit 103 stores the authentication information of FIG. 13 and the transfer restriction information of FIG. 14.

Destination slave device determining unit 123 extracts destination slave device information from the slave device transfer data stored in storage unit 103, and extracts destination cordless telephone slave device 30 of the slave device transfer data, based on the slave device identification information (a slave device name, a slave device extension number, or a slave device port number) which is set in the destination slave device information. Further, destination slave device determining unit 123, with reference to the transfer restriction information, selects only slave device for which the transfer to mobile phone 40 (authentication ID) is permitted, from among extracted destination cordless telephone slave devices 30 and determines a final destination cordless telephone slave device 30. In other words, destination slave device determining unit 123 selects a slave device in which there is no transfer regulation, and a slave device in which the transfer regulation is present and the authentication ID of the wireless IP terminal is registered, among the extracted destination cordless telephone slave devices 30.

For example, since cordless telephone slave devices 30, to which wireless IP terminal 1 is able to transfer the slave device information, are only slave devices 1, 3, 4, and 5, even if slave device 2 is set in the slave device identification information of destination slave device information transmitted from wireless IP terminal 1, destination slave device determining unit 123 does not select slave device 2 as the destination slave device.

In this way, according to Exemplary Embodiment 3, when transferring the slave device transfer data to cordless telephone slave device 30, cordless telephone master device 10 is able to restrict the transfer of some pieces of slave device transfer data, depending on a predetermined condition. Thus, even if the transfer of the slave device transfer data from mobile phone 40 to cordless telephone slave device 30 other than the desired one is indicated by the incorrect operation of the user of mobile phone 40, it is possible to prevent an erroneous transfer by cordless telephone master device 10.

Exemplary Embodiment 4

In Exemplary Embodiment 4, a description will be given on a case where mobile phone 40 and cordless telephone slave device 30 are associated in a one-to-one relationship, and the slave device transfer data is transferred to fixed cordless slave device 30, according to the determination by cordless telephone master device 10, regardless of the instruction from mobile phone 40. The present exemplary embodiment is different from Exemplary Embodiment 1 in that having different functions of storage unit 103 and destination slave device determining unit 123 of cordless telephone master device 10. In the present exemplary embodiment, destination slave device selecting unit 154 of mobile phone 40 is omitted, as compared with Exemplary Embodiments 1 to 3.

Storage unit 103 stores the authentication information illustrated in FIG. 13, and the authentication ID (hereinafter, referred to as "corresponding authentication ID information") of mobile phone 40 (wireless IP terminal) which is associated with each of cordless telephone slave devices 30 (slave devices 1 to 6), which is illustrated in FIG. 17, in a one-to-one relationship.

Destination slave device determining unit 123 determines a slave device that is associated with mobile phone 40 (authentication ID) in a one-to-one relationship, as destination cordless telephone slave device 30, with reference to the corresponding authentication information of FIG. 17 stored in storage unit 103, regardless of whether or not the destination slave device information is included in the slave device transfer data stored in storage unit 103, in other words, without extracting the destination slave device information of the slave device transfer data.

In Exemplary Embodiment 4, in FIG. 17, a description has been made on a case where the association between mobile phone 40 (authentication ID) and the destination slave device is associated in a one-to-one relationship, but present invention is not limited thereto, and the association may be made in a one-to-n relationship, while the number of authentication IDs corresponding to the slave device is plural.

In Exemplary Embodiment 4, since mobile phone 40 does not need to select a destination slave device, the slave device information is not transmitted from cordless telephone master device 10 to mobile phone 40, but in the present invention, the slave device information of the slave device 1 may be transmitted to mobile phone 40 in order to perform format conversion of the slave device transfer data, as illustrated in FIG. 18.

In this way, according to the Exemplary Embodiment 4, since mobile phone 40 and cordless telephone slave device 30 are associated in a fixed manner as a one-to-one (or one-to-n) relationship, it is possible to omit a process of selecting a destination slave device in mobile phone 40, when transferring the slave device transfer data to cordless telephone slave device 30. Thus, it is possible to prevent an erroneous transfer of transferring the slave device transfer data from mobile phone 40 to cordless telephone slave device 30 other than the desired one by an incorrect operation.

In Exemplary Embodiments 1 to 4, for example, the slave device name and the slave device number (a slave device extension number or a port number) are described as the slave device identification information for identifying the slave device, but the present invention is not limited thereto, and as long as it can identify the slave device, other types of information may be uses as slave device identification information.

In Exemplary Embodiments 1 to 4, a description has been made on a case of converting the image size of the wallpaper data in a case where the slave device transfer data includes wallpaper data, but the present invention is not limited thereto, and conversion into a predetermined format or conversion into image data of a predetermined number of colors may be performed.

In Exemplary Embodiments 1 to 4, a description has been made on a case of converting the image size of the thumbnail data in a case where the slave device transfer data includes telephone directory data, but the present invention is not limited thereto, and conversion into a predetermined format or conversion into image data of a predetermined number of colors may be performed.

INDUSTRIAL APPLICABILITY

The cordless telephone device, the cordless telephone system and the data transfer method according to the present invention are available in storing various data which are stored in a mobile phone in a cordless telephone slave device, in a state of being available in the cordless telephone slave device, without providing a new device in the cordless telephone slave device.

REFERENCE MARKS IN THE DRAWINGS

10 CORDLESS TELEPHONE MASTER DEVICE
20 ACCESS POINT
30 CORDLESS TELEPHONE SLAVE DEVICE
40 MOBILE PHONE
101 NCU AND MODEM UNIT
102 TAM UNIT
103, 131, 142 STORAGE UNIT
104, 132, 143 AUDIO INPUT OUTPUT UNIT
105, 133, 144 OPERATION UNIT
106, 134, 145 LCD UNIT
107 CORDLESS TELEPHONE SLAVE DEVICE WIRELESS I/F UNIT
108 CORDLESS TELEPHONE SLAVE DEVICE CONTROL UNIT
109, 146 WIRELESS LAN I/F UNIT
110 MASTER DEVICE CONTROL UNIT
121, 138 CALL CONTROL UNIT
122, 139 SLAVE DEVICE TRANSFER DATA RECEIVING UNIT
123 DESTINATION SLAVE DEVICE DETERMINING UNIT
124, 155 SLAVE DEVICE TRANSFER DATA CONVERSION UNIT
125 SLAVE DEVICE TRANSFER DATA TRANSMITTING UNIT
126 WIRELESS IP TERMINAL AUTHENTICATION UNIT
127 SLAVE DEVICE INFORMATION TRANSMITTING UNIT
135 CORDLESS TELEPHONE MASTER DEVICE WIRELESS I/F UNIT
136 CORDLESS TELEPHONE MASTER DEVICE CONTROL UNIT
137 SLAVE DEVICE CONTROL UNIT

141 CELLULAR WIRELESS I/F UNIT
147 EXTERNAL MEMORY I/F UNIT
148 TERMINAL CONTROL UNIT
151 CELLULAR PHONE CONTROL UNIT
152 WEB BROWSER CONTROL UNIT
153 SLAVE DEVICE TRANSFER DATA SELECTING UNIT
154 DESTINATION SLAVE DEVICE SELECTING UNIT
156 SLAVE DEVICE TRANSFER DATA TRANSMITTING UNIT
157 AUTHENTICATION REQUESTING UNIT
158 SLAVE DEVICE INFORMATION RECEIVING UNIT

The invention claimed is:

1. A cordless telephone system, comprising:
a plurality of slave devices; and
a master device of the plurality of slave devices, the master device including:
a storage unit that stores association information that associates authentication IDs with the plurality of slave devices, each of the authentication IDs being associated with multiple slave devices of the plurality of slave devices;
a wireless IP terminal authentication unit that, in operation, receives an authentication ID and an authentication password from a wireless IP terminal, determines whether or not the wireless IP terminal is permitted to be connected to the master device based on the authentication ID and the authentication password of the wireless IP terminal, and authenticates the wireless IP terminal in response to determining that the wireless IP terminal is permitted to be connected to the master device, the wireless IP terminal being wirelessly connected to the master device through a wireless LAN;
a slave device transfer data receiving unit that, in operation, receives slave device transfer data from the authenticated wireless IP terminal, and stores the received slave device transfer data in the storage unit, the slave device transfer data including image data or music data;
a destination slave device determining unit that, in operation, determines, using the association information, a plurality of destination slave devices that are associated with the authentication ID of the authenticated wireless IP terminal;
a slave device transfer data conversion unit that, in operation, converts the slave device transfer data into a data format that is supported by the plurality of destination slave devices based on a data type of the slave device transfer data and conversion format information of the plurality of destination slave devices; and
a slave device transfer data transmitting unit that, in operation, transmits the converted slave device transfer data from the storage unit to each of the plurality of destination slave devices.

2. The cordless telephone system of claim 1, wherein the music data includes ringtone data, and the slave device transfer data conversion unit in operation, converts an audio format of the ringtone data so as to be played back in a use CODEC of the plurality of destination slave devices.

3. The cordless telephone system of claim 1, wherein the music data includes ringtone data, and the slave device transfer data conversion unit in operation, performs conversion in such a manner that a data size of the ringtone data after conversion is within a size of a ringtone memory of each of the plurality of destination slave devices.

4. The cordless telephone system of claim 1, wherein the image data includes wallpaper data, and the slave device transfer data conversion unit, in operation, converts a size of the wallpaper data into a wallpaper size supported by the plurality of destination slave devices.

5. The cordless telephone system of claim 1, wherein the slave device transfer data includes telephone directory data, and the slave device transfer data conversion unit, in operation, converts a size of thumbnail image data part of the telephone directory data into a size of thumbnail image data part supported by the plurality of destination slave devices.

6. A cordless telephone system, comprising:
a plurality of slave devices; and
a master device of the plurality of slave devices, the master device including:
a storage unit that stores association information that associates authentication IDs with the plurality of slave devices, each of the authentication IDs being associated with multiple slave devices of the plurality of slave devices;
a wireless IP terminal authentication unit that, in operation, receives an authentication ID and an authentication password from a wireless IP terminal, determines whether or not the wireless IP terminal is permitted to be connected to the master device based on the authentication ID and the authentication password of the wireless IP terminal, and authenticates the wireless IP terminal in response to determining that the wireless IP terminal is permitted to be connected to the master device, the wireless IP terminal being wirelessly connected to the master device through a wireless LAN;
a slave device transfer data receiving unit that, in operation, receives, in response to the wireless IP terminal being authenticated by the wireless IP terminal authentication unit, slave device transfer data from the wireless IP terminal, the slave device transfer data including at least one of ringtone data, wallpaper data, and telephone directory data;
a destination slave device determining unit that, in operation, determines, in response to the slave device transfer data receiving unit receiving the slave device transfer data, a plurality of destination slave devices that are associated with the authentication ID of the wireless IP terminal based on the association information, the slave device transfer data including at least one of ringtone data, wallpaper data, and telephone directory data;
a slave device transfer data conversion unit that, in operation, converts the slave device transfer data, into a data format that is supported by the plurality of destination slave devices based on conversion format information of the plurality of destination slave devices; and
a slave device transfer data transmitting unit that, in operation, transmits the slave device transfer data after conversion, to the each of the plurality of destination slave devices.

7. A cordless telephone system, comprising:
a plurality of slave devices; and
a master device of the plurality of slave devices, the master device including:
a wireless IP terminal authentication unit that, in operation, determines whether or not a wireless IP terminal is connectable to the master device based on an authentication ID and an authentication password of the wireless IP terminal, which are received from the wireless IP terminal, the wireless IP terminal being wirelessly connected to the master device through a wireless LAN;

a slave device information transmitting unit that, in operation, transmits slave device information to the wireless IP terminal, the slave device information including slave device identification and conversion format information for slave devices of the plurality of slave devices that are associated with the authentication ID of the wireless IP terminal;

a slave device transfer data receiving unit that, in operation, receives converted slave device transfer data from the wireless IP terminal, and stores the converted slave device transfer data in a storage unit, the converted slave device transfer data being slave device transfer data that was converted, by the wireless IP terminal, in to a data format that is supported by the plurality slave devices using the slave device information, the converted slave device transfer data including image data or music data;

a destination slave device determining unit that, in operation, determines a destination slave device of the plurality of slave devices that is associated with the authentication ID of the wireless IP terminal; and a slave device transfer data transmitting unit that, in operation, transmits the converted slave device transfer data from the storage unit to the destination slave device.

8. A cordless telephone system, comprising:

a plurality of slave devices; and a master device of the plurality of slave devices, the master device including:

a wireless IP terminal authentication unit that, in operation, determines whether or not a wireless IP terminal is connectable to the master device based on an authentication ID and an authentication password of the wireless IP terminal, which are received from the wireless IP terminal, the wireless IP terminal being wirelessly connected to the master device through a wireless LAN;

a slave device information transmitting unit that, in operation, transmits slave device information to the wireless IP terminal, the slave device information including slave device identification and conversion format information for the plurality of slave devices;

a slave device transfer data receiving unit that, in operation, receives converted slave device transfer data from the wireless IP terminal, and stores the converted slave device transfer data in a storage unit, the converted slave device transfer data being slave device transfer data that was converted, by the wireless IP terminal, in to a data format that is supported by the plurality slave devices using the slave device information, the converted slave device transfer data including image data or music data;

a destination slave device determining unit that, in operation, selects a destination slave device of the plurality of slave devices that is associated with the authentication ID of the wireless IP terminal; and a slave device transfer data transmitting unit that, in operation, transmits the converted slave device transfer data from the storage unit to the destination slave device.

9. A data transfer method of a cordless telephone system, comprising:

receiving, by a master device, an authentication ID and an authentication password from a wireless IP terminal, the wireless IP terminal being wirelessly connected to the master device through a wireless LAN;

determining, by the master device, whether or not the wireless IP terminal is permitted to be connected to the master device based on the authentication ID and the authentication password received from the wireless IP terminal;

authenticating, by the master device, the wireless IP terminal in response to determining that the wireless IP terminal is permitted to be connected to the master device, receiving, by the master device, slave device transfer data from the wireless IP terminal in response to the wireless IP terminal being authenticated, the slave device transfer data including image data or music data;

determining, by the master device, a plurality of destination slave devices that are associated with the authentication ID of the wireless IP terminal;

converting, by the master device, the slave device transfer data into a data format that is supported by the plurality of destination slave devices based on a data type of the slave device transfer data and conversion format information of the plurality of destination slave devices; and transmitting, by the master device, the slave device transfer data to all of the plurality of destination slave devices.

* * * * *